United States Patent [19]

Onodera

[11] Patent Number: 4,850,436

[45] Date of Patent: Jul. 25, 1989

[54] ATTACHED PULVERULENT AND GRANULAR MATERIAL SHAKE-DOWN APPARATUS

[75] Inventor: Mitsuo Onodera, Soka, Japan

[73] Assignee: Hayashi Manufacturing Company, Ltd., Tokyo, Japan

[21] Appl. No.: 6,371

[22] Filed: Jan. 23, 1987

[30] Foreign Application Priority Data

Jan. 31, 1986 [JP] Japan .................... 61-011769

[51] Int. Cl.⁴ .................................... B25D 9/16
[52] U.S. Cl. ........................... 173/1; 173/116
[58] Field of Search .......... 241/1, 301; 173/1, 116, 173/119, 121, 90, 134; 60/542; 92/134; 209/365 R, 365.1

[56] References Cited

U.S. PATENT DOCUMENTS 3,456,741 7/1969 James .................... 173/119 X
3,878,902 4/1975 Matsuo .................... 173/116 X

FOREIGN PATENT DOCUMENTS 131715 10/1981 Japan .................... 173/116
82681 6/1984 Japan .

*Primary Examiner*—Mark Rosenbaum
*Attorney, Agent, or Firm*—John W. Montgomery

[57] ABSTRACT

An attached pulverulent and granular material shake down apparatus which comprises a main body of a shock application device operable by a three-way valve and a high pressure air generation device connected to the shock application device main body. The shock application device main body is composed of a valve chamber formed with an air feed/discharge port connected to an air flow path and including an umbrella-type valve therein, a communication pipe communicating with a pressure accumulator chamber for storing or releasing a high pressure air in response to the operation of the umbrella-type valve, a piston which can be accelerated to a high speed by the high pressure air released, and a return spring. The apparatus is capable of providing variable shock application forces with the piston and selecting the required shock application forces according to the use conditions of the apparatus, namely the states of pulverulent and/or granular materials, kinds of the above materials, or structures or shapes of storage vessels used.

11 Claims, 3 Drawing Sheets

ATTACHED PULVERULENT AND GRANULAR MATERIAL SHAKE-DOWN APPARATUS

BACKGROUND OF THE INVENTION

The present invention relates to an attached pulverulent and granular material shake-down apparatus which is located adjacent to a discharge hole of a pulverulent and/or granular material storage vessel for use in a silo or the like and is capable of accelerating the outflow of pulverulent and/or granular material stored in the pulverulent and/or granular material storage vessel.

DESCRIPTION OF THE PRIOR ART

Conventionally, as an apparatus of this type, there has been known an apparatus which is disclosed in Japanese Utility Model No. 82681 of 1984, (which is hereinafter referred to as the prior art apparatus).

Referring now to FIG. 2, there is shown a longitudinal side view of a prior art apparatus. As shown in FIG. 2, cylinder 101 is internally separated into a pressure accumulator chamber 104 and a piston chamber 105 by a partition plate 103 having a communication pipe 5. The pressure accumulator chamber 104 is provided on the side surface thereof with a supply nozzle 106, to which supply nozzle 106 is connected compressed air from a pressure source via a regulation valve 116. A thin flexible diaphragm sheet 108 is interposed between and grasped by a flange surface of the cylinder 101 and a flange surface of a cap 111. The diaphragm sheet 108 is formed with a plurality of small orifices 107 for fluid communication of the pressure accumulator chamber 104 with a cap chamber 109, and the cap 111 is formed with an exhaust orifice 110 for connecting the compressed air existing within the cap chamber 109 with the atmosphere. The exhaust orifice 110 is connected via a pipe 118 to an electromagnetic valve 117, so that by opening the electromagnetic valve 117, the compressed air within the cap chamber 109 can be discharged into the atmosphere. Into the piston chamber 105 there is inserted a piston 8 which can be moved upwardly and downwardly. There are inserted return springs 9 on the rod side of the piston 8 and the piston 8 is thus energized by the return springs 9 toward the head side thereof. A bottom plate 114 is mounted to the lower end portion of the cylinder 101 and is formed in the central portion thereof with an orifice through which the rod of the piston 8 can be moved. A short pipe 115 for mounting is provided on the outer peripheries of the rod orifice. The short pipe 115 has a lower surface A which provides a hammer strike surface. In this structure, if the electromagnetic valve 117 is opened, then the piston 8 is moved down rapidly and thus the end face of the rod of the piston 8 strikes against the hammer strike surface A to thereby apply a shock thereto.

However, in the above-mentioned prior art apparatus, there is necessary a piping arrangement for high pressure air which extends in two directions; one direction for the supply nozzle 106 of the pressure accumulator chamber 104, and the other for the exhaust hole 110 of the cap chamber 109. Due to this, the prior art apparatus requires a large number of man-hours for working as well as much labor and time for piping, involving a possibility for mispiping. Also, in the prior art apparatus, since the air is being constantly supplied, much air can be discharged wastefully during the striking step, and the discharging sound remains after the strike. Further, the diaphragm sheet 108 may lose its resiliency during a long period of use. In this case, a required airtight state cannot be maintained between the pressure accumulator chamber 104 and the communication port of the communication pipe 5 to thereby decrease the striking power. In addition, it is found difficult to reduce the size of the diaphragm sheet 108.

SUMMARY OF THE INVENTION

The present invention aims at eliminating the drawback found in the above-mentioned prior art apparatus.

Accordingly, it is an object of the invention to provide a pulverulent and granular material shake-down apparatus in which a high pressure air generation device is connected to a shock application device via a three-way valve by mean of an air flow passage and the shock application device can be put into operation by operating the three-way valve so as to be able to complete a shock application operation substantially instantaneously. The three-way valve applies pressure, holds the pressure constant or releases the pressure.

In attaining the above object, according to the invention, there is provided an improved pulverulent and granular material shake-down apparatus comprising a shock application device operable by means of a three-way valve and a high pressure air generation device connected to the shock application device via the three-way valve by means of an air flow path. In the present apparatus, the main body of the shock application device is formed by firmly fastening a first cylinder and a second cylinder together by a fastening member in the flange surfaces of a first flange provided at one end thereof and a second flange at the other end thereof, with the first and second cylinders connected together through the ends of a partition plate. The first flange is provided with a projected portion engagable with the second cylinder, and inside the projected portion there is provided a valve chamber which includes a recess having an air feed/discharge port extending through the bottom of the valve chamber. The partition plate is provided with a communication pipe extending from the surface thereof into the interior of the valve chamber and is open at the end thereof located in the valve chamber. The partition is also formed with a communication orifice which opens on the side of the second cylinder. Within the valve chamber, there is slidably mounted an umbrella-type valve which comprises a bottom surface having a diameter $D_2$ which is greater that the diameter of the open end portion of the communication pipe, a cylindrical portion formed of a hard resilient body having a height H which is less than the depth of the recess forming the valve chamber, and an umbrella-like portion of a soft resilient material successively extending in an umbrella-like manner from the upper surface of the cylindrical portion, with the extended end face having a dimension $D_3$ equal to the inside diameter of the recess.

When the umbrella-type valve is situated at a first position $X_1$—$X_1$ within the valve chamber, then the open end portion of the communication pipe is shut tight, and when it is situated at a second position $X_2$—$X_2$, then the open end portion of the pipe is exposed. Within the first cylinder, there is loosely fitted a piston having in the lower portion thereof a shock application portion and a spring support portion in abutment against the partition plate, and there is provided a spring between the piston and the second flange so that the piston can be energized toward the partition plate.

Also, there is formed a discharge orifice on the lower side surface of the first cylinder. Further, there are attached a shock application surface and a mounting device for mounting the shock application device main body.

Therefore, according to the invention, when a high pressure air having a pressure necessary to apply a shock is supplied through the air feed/discharge port from the high pressure air generation device via the three-way valve, the umbrella-type valve in the valve chamber is then slidably moved within the valve chamber to the first position $X_1$—$X_1$ and the bottom surface of the cylindrical portion of the umbrella-type valve is brought into abutment against the open end portion of the communication pipe to close the open end portion. At the same time, umbrella-shaped portion of the soft resilient material is depressed and deformed by the high pressure air to thereby produce a clearance between it and the inscribed peripheral surface of the valve chamber, so that the high pressure air is allowed to flow into the pressure accumulator chamber to be stored therein. When the high pressure air existing in a space on the side of the air feed/discharge port of the umbrella-type valve within the valve chamber is discharged externally by operating the three-way valve, then the umbrella-type valve is slidably moved within the valve chamber to the second position $X_2$—$X_2$ by the high pressure air in the pressure accumulator chamber. Thus, the upper surface of the umbrella-type valve is brought into abutment against the air feed/discharge port to close it and, at the same time, the open end portion of the communication pipe is exposed to allow the high pressure air within the pressure accumulator chamber to pass into the communication pipe substantially instantaneously and pressurize the upper surface of the piston with the result that the piston is accelerated greatly and caused to impinge against the shock application surface at a high speed. Simultaneously with the piston impingement the high pressure air passes through a slight clearance between the first cylinder and the piston and is then discharged from the discharge orifice in the lower side surface of the first cylinder. This exhaustion of the high pressure air is completed almost at the same time as the piston is returned to its original position due to the restoring force of the return spring.

Accordingly, in the present invention, since the sliding distance of the umbrella-type valve can be made very short, the shock application operation can be completed substantially instantaneously.

BRIEF DESCRIPTION OF THE DRAWINGS

The above and other objects and features of the invention will appear more fully hereinafter from a consideration of the following description taken in connection with the accompanying drawings, in which.

DETAILED DESCRIPTION OF THE DRAWINGS

Figure 1:
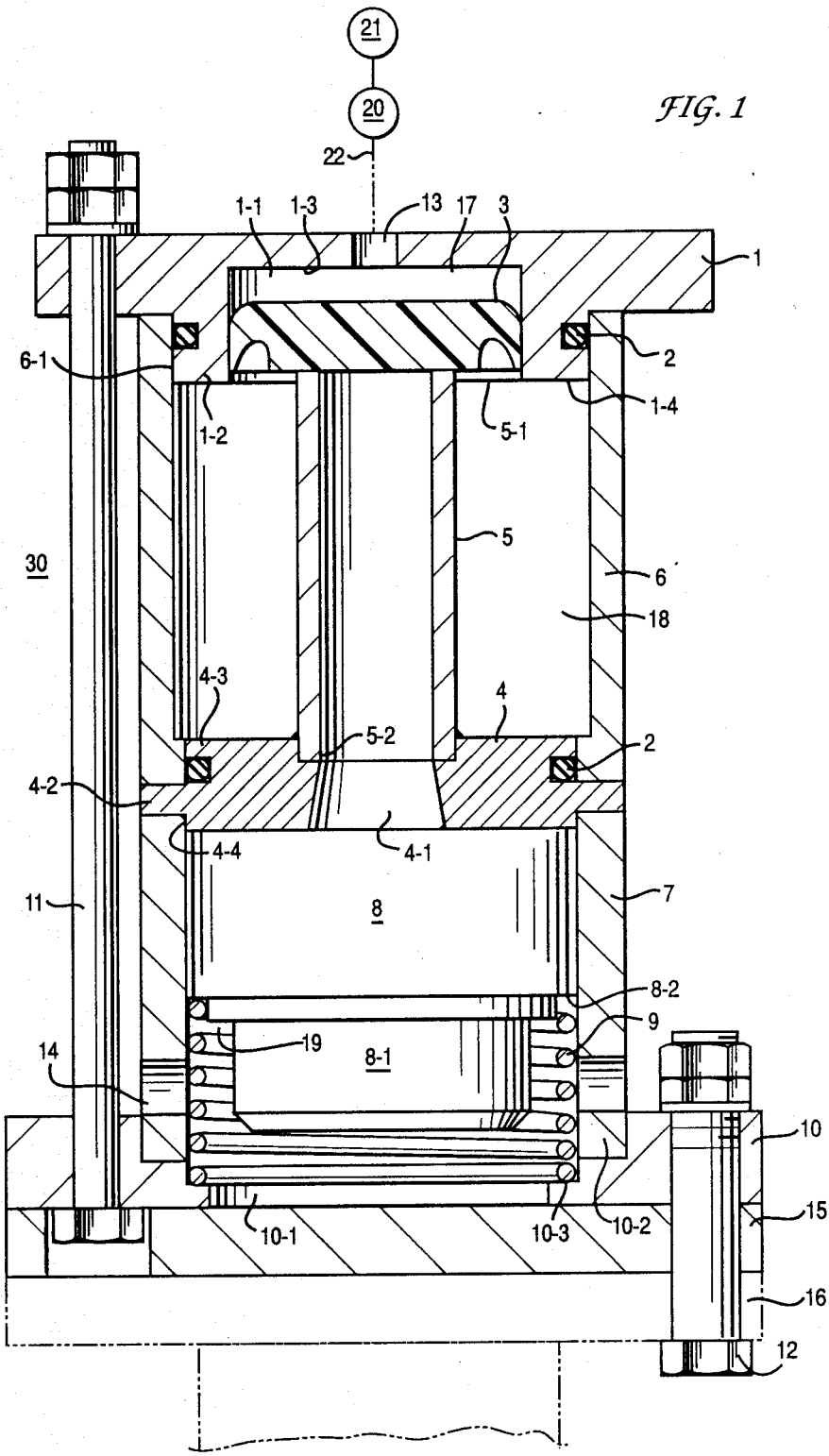
FIG. 1 is a longitudinal side section view of a pulverulent and granular material shake-down apparatus according to the invention.
Figure 2:
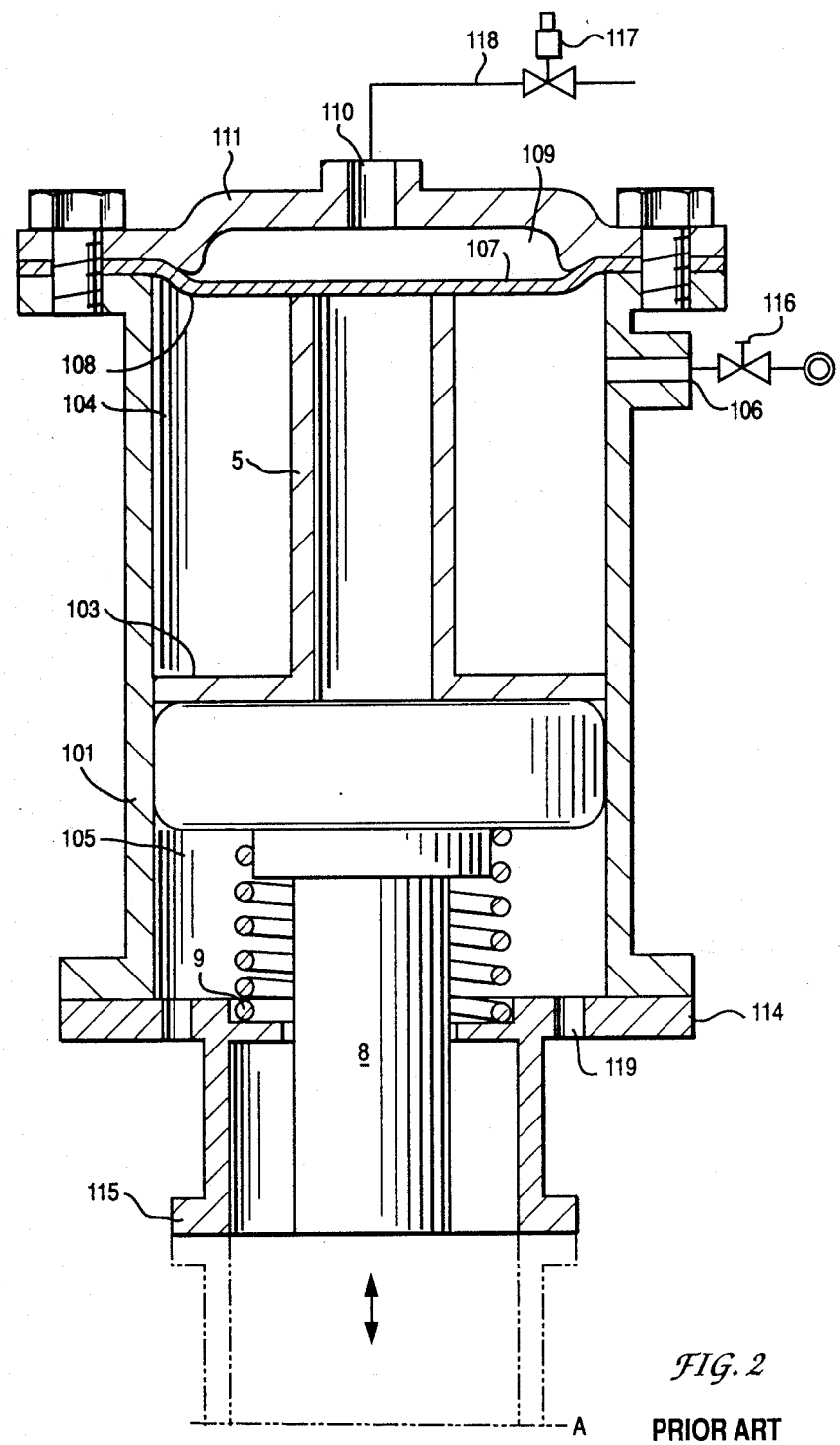
FIG. 2 is a longitudinal side section view of a pulverulent and granular material shake-down apparatus according to the prior art.
Figure 3:
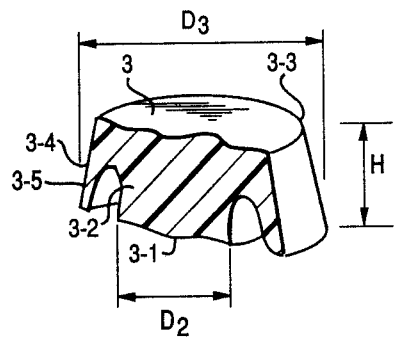
FIG. 3 is a perspective view of an umbrella-type valve employed into he present invention; and, FIG. 4a and FIG. 4b are explanatory views to illustrate the positions of the above umbrella-type valve.

A preferred embodiment according to the invention will now be described in connection with the accompanying drawings. In FIG. 1, there is shown a longitudinal side section view of the preferred embodiment of the invention, in FIG. 3 there is shown a perspective view of an umbrella-type valve employed in the above preferred embodiment of the invention, and in FIG. 4 there is shown an explanatory view which illustrates the positions of the umbrella-type valve.

In FIG. 1, reference character 21 designates a high pressure air generation device, 20 a three-way valve, 22 an air flow path, and 30 the main body of a shock application device.

Also, 1 designates a second flange, 4 a partition plate 6 a second cylinder, 7 a first cylinder, 11 a fastening member, 13 an air feed/exhaust port, and 17 a valve chamber. The high pressure air generation device 21 is connected via the three-way valve 20 to the main body of the shock application device 30 by means of the air flow path 22.

The shock application device main body 30 is formed by tightly fastening together the second cylinder 6 and the first cylinder 7, which have been connected together through the ends of the partition plate 4, by means of the fastening member 11 in the flange surfaces of a second flange 1 provided in the one end of the main body and a first flange 10 provided in the other end thereof. The fastening member 11, as shown in FIG. 1, is composed of a combination of a plurality of well-known bolts, washers and nuts.

The second flange 1 is provided with a projecting portion 1-2 extending from the one side surface thereof. The projecting portion 1-2 is in turn provided with O-rings 2 interposed between the end internal surface 6-1 of the second cylinder 6 and itself. Also, the projecting portion 1-2 is in airtight engagement with the internal surface 6-1 of the second cylinder 6. Internally of the projecting portion 1-2, there is provided a recess 1-1 which has an air feed/discharge port 13 formed in and extending through the bottom face 1-3 of the second flange 1 and also which is opened to an end face 1-4 of the projecting portion 1-2. This recess 1-1 defines the valve chamber 17.

On the peripheries of the partition plate 4, there are provided an end portion 4-2 interposed between by the ends of the second cylinder 6 and first cylinder 7, end portions 4-3 and 4-4 respectively engaged with the internal surfaces of the first and second cylinders 6 and 7, and a communication pipe 5 provided in the central portion of the partition plate 4 and projecting within the second cylinder 6 into the valve chamber 17. The communication pipe 5 is open on the side thereof facing the valve chamber 17 to provide an open end portion 5-1, and on the other side thereof there is formed a communication orifice 4-1 which communicates with the base portion 5-2 of the communication pipe 5 and extends through the partition plate 4. There are provided O-rings 2 between the end portion 4-3 of the partition plate 4 and the second cylinder 6 so that an air tight condition is maintained between the partition plate end portion 4-3 and the second cylinder 6.

Within the valve chamber 17, there is provided an umbrella-type valve 3 such that it is free to slide. The umbrella-type valve 3, for example, as shown by a perspective view in FIG. 3, comprises a bottom surface 3-1 having a diameter $D_2$ greater than the diameter of the open end portion 5-1 of the communication pipe 5, a cylindrical portion 3-2 formed of hard resilient material and having a height H smaller than the depth of the recess 1-1, and an umbrella-shaped portion of soft resilient material 3-4 successively extending in an umbrella-like manner from the upper surface 3-3 of the cylindrical portion 3-2 in the downward and outward direction therefrom, with the extended end face thereof 3-5 having a diameter $D_3$ equal to the inside diameter of the recess 1-1.

Figures 4A, 4B:
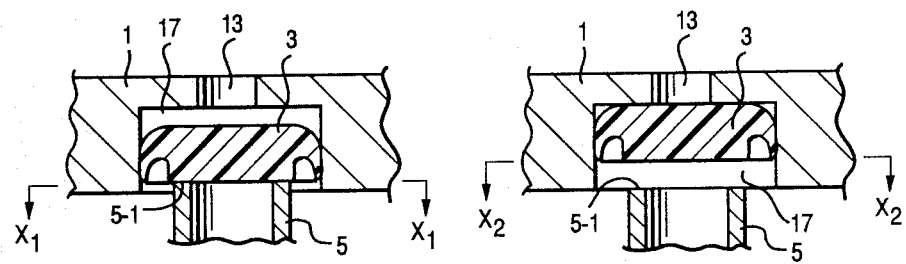

In FIG. 4a and FIG. 4b there are shown explanatory views which illustrate the positions of the umbrella-type valve located within the valve chamber 17. Specifically, when the umbrella-type valve 3 is situated at a first position $X_1$—$X_1$ in the valve chamber 17 as shown in FIG. 4a, then the open end portion 5-1 of the communication pipe 5 is hermetically closed; that is, the communication pipe 5 is cut off. When the umbrella-type valve 3 is situated at a second position $X_2$—$X_2$ as shown in FIG. 4b, then the open end portion 5-1 is exposed; that is, the pressure accumulator chamber 18 is brought into fluid communication with the communication pipe 5 and the air feed/discharge port 13 is hermetically closed.

As shown in FIG. 1, downwardly of the partition plate 4 there is loosely fitted a piston 8 within the first cylinder 7. The piston 8 includes in the lower portion thereof a shock application portion 8-1 and a spring support portion 8-2, and is supported by a spring 9 between the partition plate 4 and the first flange 10 such that the piston 8 is urged toward the partition plate 4.

There is formed a discharge orifice 14 on the side surface of the lower portion of the first cylinder 7.

Further, the first flange 10 includes an orifice 10-1 into which the piston shock application portion 8-1 can be loosely fitted, a connection portion 10-2 for connecting with the first cylinder 7, and a mounting portion 10-3 for mounting the spring 9. The first flange 10 is also provided with a fastening member 12 which fastens the shock application device main body 30 to a member 16 to be shocked via a spacer 15 or the like.

Now, a description will be given of the operation of the pulverulent and granular material shake-down apparatus of the invention constructed in the above-mentioned manner.

Here, if a high pressure fluid such as air having a pressure necessary to apply shocks, for example, a pressure of 2–7 kfg/cm$^2$, is supplied from the high pressure air generation device 21 to the air feed/discharge port 13 of the shock application device main body 30 by operation of the three-way valve 20, then the umbrella-type valve 3 is moved to a first position $X_1$ 13 $X_1$ (FIG. 4a) within the valve chamber 17. Thus, the bottom surface 3-1 of the cylindrical portion 3-2 of the umbrella-type valve 3 is brought into abutment against the open end portion 5-1 of the communication pipe 5 to close the open end portion 5-1, and at the same time the high pressure air presses against the umbrella-shaped portion 3-4 of the valve 3 to thereby deform the umbrella-shaped portion 3-4. As a result, the high pressure air flows through a clearance between the umbrella-shaped portion 3-4 and the inscribed peripheral surface of the valve chamber 17 into the pressure accumulator chamber 18 and is stored therein. Next, if the high pressure air existing in a space on the air feed/discharge port 13 side of the umbrella-type valve 3 in the valve chamber 17 is discharged externally by operating the three-way valve 3, then the umbrella-type valve 3 is slidably moved within the valve chamber 17 to the second position $X_2$—$X_2$ (FIG. 4b). Thus, the upper surface of the umbrella-type valve 3 is abutted against the air feed/discharge port 13 to close it and at the same time the open end portion 5-1 of the communication pipe 5 is exposed so that the high pressure air within the pressure accumulator chamber 18 is allowed to pass through the communication pipe 5 substantially instantaneously to press against the upper surface of the piston 8 with the result that the piston 8 is greatly accelerated to impinge at a high speed against the shock application surface on spacer 15 attached to the first flange 10. Thus, the piston 8 applies shocks to the shock application surface through orifice 10-1. Simultaneously with the impingement of the piston, the high pressure air is allowed to pass through a slight clearance, for example, a clearance of the order of 0.4 mm between the inside diameter of the first cylinder 7 and the piston 8 and is then discharged externally from the discharge orifice 14 formed on the lower side surface of the first cylinder 7. The exhaustion of the high pressure air is completed almost at the same time the piston 8 is returned to its original position by the restoring force of the spring 9.

The above-mentioned series of cycles of the high pressure air can be accomplished successively by operating the three-way valve 20, so that the attached pulverulent and/or granular material can be shaken off effectively.

As has been described heretofore, according to the invention, there is provided an attached pulverulent and granular material shake-down apparatus in which a high pressure air generation device is connected via a three-way valve to a main body of a shock application device by means of an air flow path. The main body of the shock application device can be operated by operating the three-way valve. The shock application device main body comprises a valve chamber formed with an air feed/discharge port connecting with the air flow path and including an umbrella-type valve therein; a communication pipe communicating with a pressure accumulator chamber in which a high pressure air can be stored and released by means of the movement of the umbrella-type valve; a piston which can be accelerated to a high speed by the released high pressure air; and a spring for return. In this construction, by introducing a high pressure air having a pressure necessary for generation of a shock, for example, a pressure of the order of 2–7 kgf/cm$_2$ from the high pressure air generation device into the pressure accumulator chamber, the shock application forces of the piston can be selected with the resultant successive shock application cycles being very short. Therefore, the pulverulent and granular material shake-down apparatus of the invention is advantageous in that it is capable of selecting the required shock forces according to the conditions of the use of the present apparatus; that is, according to the states of the attached pulverulent and/or granular materials, the kinds of the pulverulent and/or granular materials, or the structure, shapes or other conditions of the storage vessels to be used.

Also, since the piston shock application is performed by use of the high pressure stored within the pressure accumulator chamber, the invention consumes less amount of the high pressure air when compared with the prior art apparatus and produces exhaust noises of reduced volume to thereby eliminate the need for a sound arrestor.

Further, the umbrella-type valve is easy to manufacture and inexpensive, is excellent in durability, and is easy to miniaturize. Since only one air feed/discharge port is necessary for the high pressure air, the machining cost of the invention in inexpensive and the piping thereof is easy.

While the invention has been described in connection with a preferred embodiment, it is not intended to limit the scope of the invention to the particular form set forth but, on the contrary, it is intended to cover such alternatives, modifications, and equivalents as may be included in the spirit and scope of the invention as defined by the appended claims.

I claim:

1. A shock application device for attachment to a housing comprising:
   a. a cylinder for attachment to said housing,
   b. a piston slidably mounted in said cylinder,
   c. a hammer portion integrally formed with said piston for providing an impact to said housing,
   d. a fluid pressure accumulator chamber in said cylinder for storing pressure received from an external source,
   e. Conduit means in said cylinder for coupling pressurized fluid stored in said accumulator to said piston to move said piston toward said housing,
   f. a valve chamber in fluid transfer relationship with said accumulator and said conduit,
   g. a single orifice in said valve chamber, said single orifice receiving said pressurized fluid from said external source,
   h. a valve in said valve chamber for movement to a first position by fluid received at said orifice for enabling pressurization of said accumulator with said received fluid and for movement to a second position by said pressure in said accumulator to enable said pressurized accumulator fluid to be coupled to said piston through said conduit means for causing said piston and hammer portion to move toward and strike said housing to create a shock.

2. A shock application device as in claim 1 wherein said conduit means comprises:
   a. a partition wall in said cylinder for dividing said cylinder into first and second adjoining cylinders with said piston in said first cylinder,
   b. an orifice in said partition wall, and
   c. a pipe rigidly attached to said partition wall in fluid communication with said orifice and extending an open end into said second cylinder for coupling pressurized fluid from said accumulator through said pipe to said piston to move said piston.

3. A shock application device as in claim 2 wherein said valve chamber comprises:
   a. a plate attached to and sealing the outer end of said second cylinder,
   b. a recess formed with the interior side of said plate, said recess being in axial alignment with the outer end of said pipe for receiving said valve and,
   c. said orifice in said valve chamber being formed in the bottom of said recess such that said valve in said first position seals said open end of said pipe and allows said pressurized fluids to charge said accumulator and in said second position seals said orifice in said recess bottom and exposes said pipe open end to allow said accumulator charge to be coupled through said pipe to said piston to move said piston.

4. A shock application device as in claim 3 wherein said valve comprises:
   a. a relatively rigid body portion having a diameter greater than said pipe open end for sealing said pipe open end in said first position and sealing said recess orifice in said second position, and
   b. a relatively pliant umbrella portion formed with said body portion and having a diameter at least equal to the diameter of said recess whereby pressurized fluid entering said recess orifice moves said valve to said first position sealing said pipe open end and forcing said pliant umbrella portion inwardly to allow pressurized fluid to enter said accumulator and when said pressure is removed from said recess orifice, said valve moves to said second position because of the pressure in said accumulator so as to expose said open end of said pipe to said accumulator charge thereby moving said piston.

5. A shock applicator as in claim 4 wherein said accumulator comprises the volume of said second cylinder created by said plate sealing said outer end of said second cylinder and surrounding said pipe.

6. A shock application device as in claim 5 further comprising:
   a. said first and second cylinders being separately formed and joined in abutting relationship with said partition wall,
   b. a mounting plate on the outer end of said first cylinder and having an orifice through which said piston hammer may project,
   c. a first flange extending from said sealing plate on the outer end of said second cylinder and a second flange extending from said mounting plate on the outer end of said first cylinder, and
   d. means attached to said first and second flanges to hold said first and second cylinders and said partition wall in a unitary relationship.

7. A shock application device as in claim 6 further comprising:
   a. an orifice in the wall of said first cylinder, and
   b. said piston having a diameter slightly less than said first cylinder inside diameter so as to allow said pressurized fluid from said accumulator to pass around said piston and out said orifice in said wall of said first cylinder.

8. A shock application device as in claim 7 further comprising biasing means in said first cylinder between said piston and said mounting plate to urge said piston away from said housing.

9. A shock application device as in claim 8 wherein said biasing device is a spring.

10. A shock application device as in claim 9 further including a striking plate positioned between said mounting plate and said housing to absorb the blows of said hammer portion of said piston.

11. A method of creating a shock to a housing having a cylinder attached to said housing, a piston slidably mounted in said cylinder, a hammer portion integrally formed with said piston for providing an impact to said housing, an accumulator chamber for storing fluid pressure received from an external pressure source, a passageway for coupling pressurized fluid from said accumulator to said piston to move said piston in forcible contact with said housing to create a shock, and a valve chamber operatively coupled to said accumulator chamber and said fluid coupling passageway, said method comprising the steps of:

a. moving a valve in said valve chamber to a first position with fluid pressure from said external source to enable pressurization of said accumulator chamber with said fluid pressure,
b. discharging said pressure from said valve chamber, and
c. moving said valve to a second position with said pressure in said accumulator, said second position coupling said pressure in said accumulator through said passageway to said piston for causing said piston and said hammer to move toward and strike said housing to create a shock.

* * * * *

UNITED STATES PATENT AND TRADEMARK OFFICE
CERTIFICATE OF CORRECTION

PATENT NO. : 4,850,436

DATED : July 25, 1989

INVENTOR(S) : Mitsuo Onodera

It is certified that error appears in the above-identified patent and that said Letters Patent is hereby corrected as shown below:

Column 5, line 53, "13" should be changed to a -- - --.

Column 7, line 60, the word --single-- should be inserted after the word "said".

Signed and Sealed this

Twenty-eighth Day of January, 1992

Attest:

HARRY F. MANBECK, JR.

*Attesting Officer*  *Commissioner of Patents and Trademarks*